Dec. 22, 1964   H. KÖPPEN ETAL   3,162,111
PHOTOGRAPHIC CAMERA PROVIDED WITH AN AUTOMATIC
FLASH EXPOSURE MECHANISM
Filed July 5, 1962   2 Sheets-Sheet 1

3,162,111
PHOTOGRAPHIC CAMERA PROVIDED WITH AN
AUTOMATIC FLASH EXPOSURE MECHANISM
Heinz Köppen, Stuttgart, and Willi Günther, Stuttgart-
Mohringen, Germany, assignors to Zeiss Ikon Aktien-
gesellschaft, Stuttgart, Germany
Filed July 5, 1962, Ser. No. 207,578
Claims priority, application Germany, July 15, 1961,
Z 8,864
4 Claims. (Cl. 95—64)

This invention relates to improvements in photographic cameras and concerns particularly photographic cameras which are provided with an automatic flash exposure mechanism in connection with an interchangeable lens system.

Photographic cameras and shutters are known which are provided with several operating ranges, such as a flash exposure range, an operating range for a manual adjustment or a preselection of the diaphragm, an operating range for an exposure control mechanism, and which as a further improvement are also provided with an automatic flash exposure mechanism by means of which the diaphragm is formed automatically in dependence of the adjusted guide number and distance values so that the camera user is relieved of any photographic calculations.

It is the object of the invention to adapt the above described type of a photographic camera or shutter to be used in connection with interchangeable lens systems in that the elements required for the automatic formation of the diaphragm for the purpose of making a flash bulb exposure are arranged within the camera or within the shutter which is fixedly mounted on the camera, and in that the interchangeable lens system merely contains the means for introducing the adjusted distance value into the automatic flash bulb exposure range.

The means for introducing the adjusted distance value into the automatic flash bulb exposure mechanism consists according to a particular feature of the invention of a deflection cam arranged at or in the interchangeable lens system. The transmission of the distance value to the automatic flash bulb mechanism, which is arranged in the camera or in the shutter, is carried out according to another feature of the invention by a member of a distance scanning element which protrudes from the automatic flash bulb mechanism arranged in the camera and abuts the distance deflection cam and is controlled by the same.

This distance deflection cam of the interchangeable lens system is provided on the distance adjusting ring or distance scale ring. While the distance adjusting ring is a part of the distance adjusting mechanism and carries the distance adjusting handles, the distance scale ring is intended as alternative and is operated by the distance adjusting member arranged on the camera or on the shutter.

It is another important feature of the invention that the ring serving for the selection of the different operating ranges and being provided with various scales and marks is arranged on the camera or on the stationary shutter thereon, respectively. The exchangeable lens system retains of all the auxiliary elements necessary for the automatic flash bulb mechanism merely the distance deflection cam.

The simplicity of construction obtained by the invention is also evident by the one and only influencing member which is provided for the formation of a diaphragm aperture according to the adjusted guide number and distance, or to the prevailing light value or the preselected diaphragm value, respectively, which member is controlled in dependence of these values and affects the diaphragm mechanism directly or indirectly.

In completely interchangeable lens systems this influencing member acts upon an intermediate ring which is arranged in the camera or in the shutter, respectively, and is in connection with the diaphragm mechanism arranged in the interchangeable lens system by means of a releasable coupling.

In partially interchangeable lens systems this influencing member acts, however, directly on the diaphragm mechanism remaining in the camera. This may be effected by a moving device consisting preferably of a catch member and a series of steps, or by a connection of some other type. Of importance in these automatic diaphragm mechanisms is that upon release of the camera a stop will occur which terminates the return movement of the rotatable diaphragm cage, whereby the duration of the return movement depends in the range of the automatic flash bulb mechanism on the adjusted distance and guide number, in the range of the manual diaphragm adjustment or preselection, respectively, on the adjusted diaphragm value, and in the range of the automatic exposure control on the prevailing light conditions.

These and other features of the invention will now be described in detail with reference to the accompanying drawings which illustrate two species of the invention. These embodiments are presumed to be provided with an automatic diaphragm mechanism having only one rotatable diaphragm cage.

Figure 1:
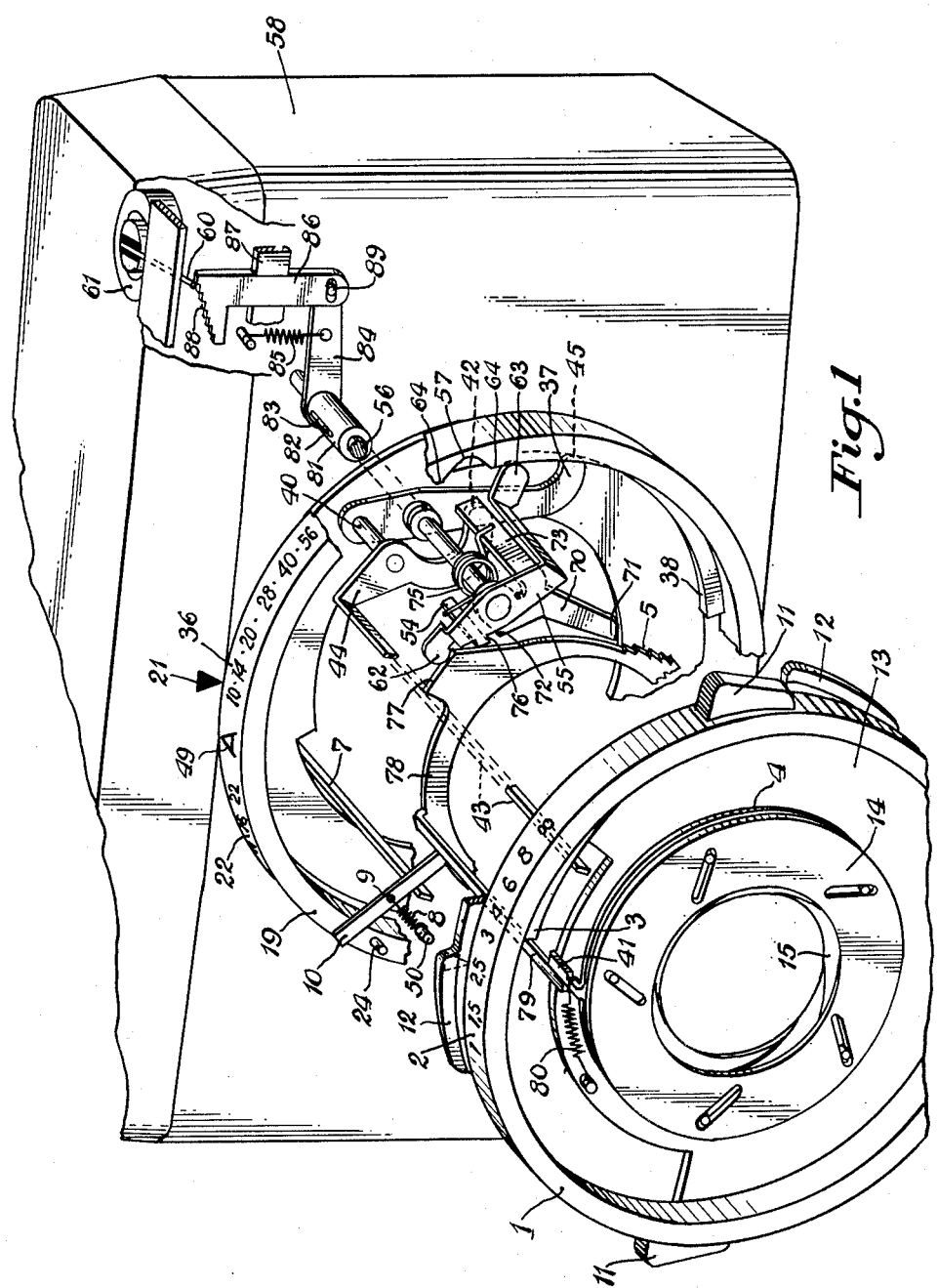
FIG. 1 illustrates diagrammatically one embodiment of the invention.

Referring to FIG. 1, the camera casing is designated with 58, while the reference numeral 1 designates the distance adjustment ring, and the reference numeral 19 designates the actuating ring for the different operating ranges of the camera. The distance adjustment ring 1 is carried by the interchangeable lens system and is provided with the distance scale 2, while the actuating ring 19 is arranged on the camera casing 58 and is provided with a guide number scale 36, a diaphragm aperture scale 22 and a mark "A" 49 for the automatic exposure range. The distance adjustment ring 1 is also provided with handles 11 and with bayonet projections 12. A common index 21 serves for all scales and the mark "A," and 13 indicates a portion of the mount of the interchangeable lens system.

The diaphragm mechanism arranged within the interchangeable lens system comprises a stationary diaphragm cage 14 having arranged adjacent thereto a rotatable diaphragm cage 4 which effects the opening and closing of the diaphragm segments 15. This diaphragm cage 4 is controlled by an intermediate ring 78 which is arranged on the camera and is connected with the diaphragm cage 4 by an axially extending coupling rod 79 which abuts a radial projection 41 of the diaphragm cage 4. A spring 80 seeks to rotate the diaphragm cage 4 toward a closing of the diaphragm segments, i.e. in counterclockwise direction. The intermediate ring 78 is provided with a radial arm 10 to which is attached one end of a spring 8 at 9, the other end of which is fastened at 50 to a stationary part in the camera casing. When the shutter is tensioned, this ring 78 is held against the action of the spring 8 by a locking member 7 in one end position which assures a fully open diaphragm aperture. This locking member 7 is operated by the tensioning of the shutter and when the latter is released, the locking member 7 moves into a position which makes the return movement of the diaphragm mechanism possible.

The distance adjusting ring 1 is provided at its inner circumference with a deflection and compensating cam 3 which at smaller distance values extends more toward the optical axis and becomes flatter at larger distance values. The actuating ring 19 is provided at its inner circumference with a deflection cam 38 the shape of which is adapted to the guide numbers to be adjusted. That part of the cam 38 which protrudes more toward the optical axis corresponds to higher guide numbers, while the more receding part of the cam 38 corresponds to lower guide numbers.

In cooperation with these cams 3 and 38 are intermediate elements in the form of scanning levers. These intermediate elements during their rotative movement pick up the adjusted values of distance and guide number and transfer them to an influencing member which stores all adjusted and scanned values in its position and upon release of the camera introduces them into the diaphragm mechanism for the purpose of forming the proper diaphragm aperture.

The deflection cam 3 on the ring 1 is further operatively connected with a projection 43 on a lever 44 whose axis of rotation is a shaft 40. The deflection cam 38 on the ring 19 is operatively connected with a scanning lever 37 whose axis of rotation is formed by a shaft 56. The scanning lever 37 is shaped in such a manner that its lower end 45 is able to cooperate with the cam 38 and that it carries the shaft 40 on which the scanning lever 44 is mounted.

It is apparent from the drawing that when the ring 19 is adjusted to higher guide numbers the result is that a rotative movement of the scanning lever 37 about its axis 56 takes place which in turn affects the lever 44 whose axis 40 is carried by the lever 37. If for instance the lever 37 upon an adjustment to another guide number rotates clockwise, the axis 40 is taken along in this direction. Since, however, the lever 44 with its axially extending scanning projection 43 engages the cam 3, it will be rotated in counterclockwise direction, which means that the lower end 42 of the lever 44 performs an upward movement.

As described before, the projection 43 of the distance scanning lever 44 engages the cam 3 on the distance adjusting ring 1. If smaller distance values are adjusted, the scanning projection 43 is moved counterclockwise, i.e. toward the optical axis, which results in an upward movement of the lever end 42. As will be seen from the drawing, an adjustment to higher guide numbers and smaller distance values will cause the scanning lever 44 to rotate counterclockwise, while an adjustment to larger distance values will cause the lever 44 to rotate from the illustrated position in a clockwise direction. An adjustment to still smaller guide numbers is not possible, since the index 21 is already opposite the smallest guide number 10.

Owing to the fact that the axis of rotation 40 of the scanning lever 44 is supported by the other scanning lever 37, both scanning values are stored in the lever 44. More explicitly, the position of the lever end 42 is the sum of the adjusted values of guide number and distance. Thus the lever end 42 is suited to control an influencing member which in cooperation with the diaphragm mechanism determines the formation of the diaphragm aperture for the automatic flash bulb exposure range.

This control according to a particular feature of the invention is made possible in that the lever end 42 is brought into engagement with a lateral extension piece 73 of a catch lever 70 which serves as an influencing member for the diaphragm mechanism and is provided at its lower end with a tooth-like part 71. This catch lever 70 is loosely rotatably mounted on the shaft 56 which serves also as a bearing shaft for the scanning lever 37 which latter is likewise loosely rotatably mounted on it. This bearing shaft 56 forms at the same time the axis of rotation for a scanning device associated with a measuring instrument pointer 60 which, when the range of the automatic exposure mechanism is used, determines the aperture of the diaphragm by means of the same catch lever 70. This scanning device consists substantially of a lever assembly 84, 86 linked together by a pin-slot connection 89 wherein the vertically movable lever 86 is guided parallel in a slide bearing 87. At the upper end of the lever 86 is arranged a series of steps 88 which cooperate with the pointer 60 of the measuring instrument 61. 81 designates a sleeve with pin and slot connection 82, 83 which maintains an operative connection between the axis of rotation 56 and the scanning device 84 to 88 even when the camera objective is axially adjusted during focussing. A spring 85 acts upon the lever 84 and seeks to pull the scanning lever 86 upwardly and to rotate the shaft 56 counterclockwise.

The automatic exposure control mechanism also contains a control lever 55 which is fixedly mounted on the shaft 56. This control lever 55 has a lower offset scanning end 63, an upper scanning end 62 and a contact surface 54 which is engaged by one end of a torsion spring 75 coiled about the shaft 56. The other end of the torsion spring 75 engages a lateral projection 73 of the catch lever 70. This spring 75 seeks to urge the lever end 62 against a raised portion 77 on the intermediate ring 78 and the lever end 63 against the cam surfaces 64 on the actuating ring 19. Furthermore, the spring 75 by means of the coupling 42, 73 causes the scanning projection 43 of the lever 44 to be pressed against the cam 3 while the scanning end 45 of the lever 37 is pressed against the cam 38. Finally, the spring 75 also urges the tooth 71 of the catch lever 70 toward its operative position with the intermediate ring 78.

The intermediate ring 78 is provided with a series of steps 5 which are approximately radial. This series of steps 5 form together with the catch member 70 a path compensator which permits the catch member 70 to adjust the diaphragm to predetermined apertures after release of the ring 78 and subsequent rerun because the catch member 70 is forced to assume predetermined angular positions. If for instance the tooth 71 of the catch lever 70 is close to the series of steps 5 as a result of an adjusted long distance and a small guide number, then the rerun of the ring 78 and therewith of the diaphragm cage 4 effected by the camera release will be stopped already after only a small movement which means that the diaphragm has not been closed or only very little. If, however, a higher guide number and a smaller distance value has been set, then the tooth 71 of the catch member 70 will be positioned at a larger distance away from the series of steps 5. Consequently, the return movement of the ring 78 will be much longer before it comes to an engagement between the series of steps 5 and the tooth 71, which means that the diaphragm has been closed down to a smaller aperture.

It has been described before that the lever end 63 of the control lever 55 engages the actuating ring 19 at the areas 64 on the inner circumference of this ring. Between these areas 64 is arranged a recess 57 into which the lever end 63 may enter. The areas 64 form the disconnecting areas for the automatic exposure control mechanism which come into effect when the camera has been adjusted for using the automatic flash bulb exposure mechanism or the range of the manual diaphragm setting, whereas the recess 57 acts as a connecting cam when the automatic exposure control mechanism is to be employed. In this latter case the lever end 63 drops into the recess 57 and the prior blocking of the movability of the control lever 55 and the shaft 56 is abolished.

It also has been stated before that the upper end 62 of the lever 55 engages the projection 77 of the ring 78 which likewise effects a blocking of the scanning device (the shaft 56 and the scanning device 84 to 89). This blocking takes place, however, only in the tensioned condition of the camera. Upon release of the camera the ring 78 commences to run counterclockwise whereby the lever end 62 slides off the projection 77 of the ring 78 and becomes freely movable. This means that in the tensioned camera the scanning device 84 to 89 is not operative. The pointer 60 of the measuring instrument 61 is able to move freely and to take the position which corresponds to the prevailing light conditions of the object to be photographed. Only upon release of the camera the scanning device is set free, the bar 86 with the scanning steps 88 jumps upwardly and comes to rest in an abutting position which depends from the adjusted position of the pointer. Obviously, there is provided a clamping device for the pointer 60 which, however, is not illustrated. The scanning position of the scanning device results in a definite rotative position of the shaft 56 which in turn results in a corresponding taking along and adjusting of the catch lever 70 by means of the coupling surfaces 72, 76.

The already mentioned radial arm 10 on the ring 78 is positioned in such a manner that it serves as a stop for a pin 24 on the ring 19. These two members 10 and 24, when engaged, constitute the manual diaphragm adjustment. The stop 24 constitutes the preselection stop in the range of the manual diaphragm adjustment. If an aperture f:22 has been adjusted, the stop 24 is at its greatest distance away from the arm 10 which means that upon release of the camera the rings 78 and 4 are able to perform the longest possible return, whereas the return run is the shortest when the diaphragm aperture has been set to its largest size.

Upon attaching the interchangeable lens system to the camera by means of the bayonet projections 12, the coupling projections 41, 79 come into engagement with one another and the scanning projection 43 comes into engagement with the distance deflection cam 3.

The operation in accordance with the preceding disclosure is as follows: If the automatic flash bulb exposure mechanism is to be used, the scanning levers 44 and 37 corresponding to the shape of the cams 3 and 38, respectively, are deflected. The counterclockwise rotation of the lever 44, which unites the sum of the deflections in its lever end 42, is the larger the smaller the adjusted distance and the higher the adjusted guide number is. The upward movement of the lever end 42 resulting from this counterclockwise rotation effects a taking along of the catch lever 70 also in counterclockwise direction so that the tooth 71 moves more and more away from the series of steps 5. This means that upon release of the camera and subsequent return run of the ring 78 the series of steps 5 will come into engagement with the tooth 71 only after a certain time so that a correspondingly smaller diaphragm aperture is formed.

Longer distances and lower guide numbers result in a reversed effect. The two scanning levers 37 and 44 perform clockwise movements so that the catch lever 70 also moves in clockwise direction. The tooth 71 therefore is close to the series of steps 5 so that already after a short return run of the ring 78 an engagement of the tooth 71 and the closest steps of the series of step 5 will take place. Thus, the diaphragm is not closed at all or only to a negligible degree.

When the camera is adjusted to employing the automatic flash bulb exposure mechanism, any operation of the other adjustable operating ranges is precluded. The scanning device of the automatic exposure control mechanism is blocked in that the control lever 55 rests against one of the elevations 64 on the ring 19 and is therefore unable to move. The shaft 56 therefore serves only as a bearing pivot for the scanning lever 37 and the catch lever 70. To influence the diaphragm mechanism by the pin 24 of the range of the manual diaphragm selection is not possible since the stop 24 is so far away from the arm 10 that an encounter is impossible.

If now the camera is adjusted to the operating range of the automatic exposure control mechanism by moving the mark "A" 49 opposite the index 21, the lever end 63 of the control lever 55 will drop into the recess 57 of the ring 19 and the control lever 55 with the shaft 56 and the scanning device 84 to 89 are ready for action. In the tensioned condition of the camera, however, an operation is still not possible because the upper lever end 62 of the lever 55 is placed on the elevation 77 of the ring 78. Only when the camera is released and the ring 78 performs its counterclockwise return movement, the lever end 62 will abandon the elevation 77, and the scanning device 84 to 89 is permitted to operate with the aid of the spring 85 for bringing one of the steps 88 into engagement with the pointer 60. The control lever 55, which serves not only for switching the automatic exposure control mechanism on and off in dependence of the selected range, but also for the direct taking along of the catch lever 70 (areas 72, 76), now guides the catch lever 70 into the rotative position which corresponds to the position of the scanning device and after a shorter or longer return run of the ring 78 an engagement of the tooth 71 with one step of the series of steps 5 will take place and therewith the corresponding formation of the diaphragm aperture. Upon a new tensioning of the camera the lever end 62 again will move up on the elevation 77 and the connection between the pointer 60 and the steps 88 is interrupted.

If the camera is adjusted to the operating range of the manual diaphragm selection by moving one of the values of the diaphragm scale 22 opposite the index 21, the pin 24 is moved so closely to its radial arm 10 that a diaphragm aperture corresponding to the selected values is assured by the engagement of the arm 10 with the pin 24 upon release of the camera.

Figure 2:
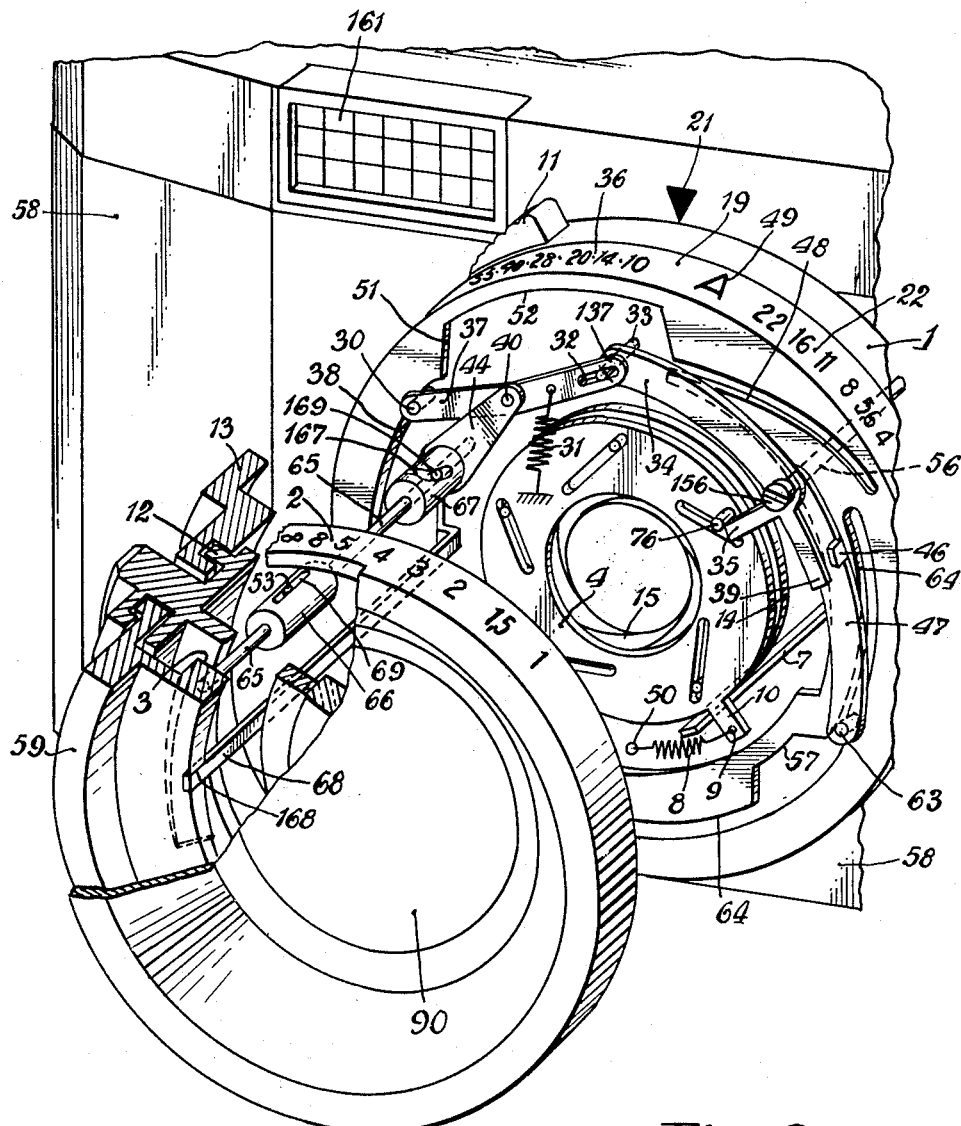
FIG. 2 illustrates a somewhat modified embodiment of the invention.

In the modified construction illustrated in FIG. 2, like reference numerals correspond to like parts in FIG. 1. The exchangeable optical member is designated with 90 and may consist of an exchangeable front lens. This front lens with its holder or mount 12 is supported by a mounting ring 13 which is provided with the bayonet projections (not illustrated) and is surrounded by a distance scale ring 59 which is provided with the distance scale 2. The distance scale ring 59 has arranged on its area facing the camera the distance deflecting cam 3 which is engaged by an axially extending pin 65.

The cam 3 is shaped and adapted to the distance adjusting values in such a manner that with smaller distance values it extends axially with increasing height toward the camera. This has the result that upon adjustment to smaller distance values the scanning pin 65 will be slidably displaced toward the camera.

Besides the scanning pin 65 there protrudes from the camera also a transmission rod 68 which engages a recess 168 provided in the distance scale ring 59. This transmission rod 68 is connected with the distance adjustment ring 1, which is arranged on the camera and carries the adjusting handles 11, and assures the synchronism between the rings 1 and 59.

The distance scanning pin 65 is connected with a distance scanning lever provided on the camera by means of two sleeve connectors 66, 53, 69, and 67, 167, 169. The first named guide sleeve 66 is stationary and is provided with a slot 69 parallel to the optical axis, in which slot is guided a pin 53 mounted transversely on the distance scanning pin 65. The second guide sleeve 67 is fixedly connected on one end of the scanning lever 44 and is provided with a helical groove 167 into which extends the pin 169 likewise attached transversely to the distance scanning pin 65. It is apparent that with a displacement of the scanning pin 65 in the direction toward the camera the sleeve 67 and therewith the scanning lever 44 performs a counterclockwise rotation, and that a displacement of the scanning pin 65 in the direction toward the front lens results in a clockwise rotation of the sleeve 67 and the lever 44 connected therewith.

The camera illustrated in FIG. 2 shows also the diaphragm mechanism which consists of the stationary diaphragm cage 14, the rotatable diaphragm cage 4 and the diaphragm segments 15 and is connected with the lenses remaining on the objective, and further shows the ring 19 for adjusting the camera to different operating ranges which ring bears the various scales and marks required for the individual operating ranges.

The camera is provided with three adjustable operating ranges, namely one for the automatic flash bulb exposure mechanism, one for the automatic exposure control mechanism, and one for the manual aperture formation. Consequently, the actuating ring 19 has a guide number scale 36, a mark "A" designated with 49 for the adjustment of the range of the automatic exposure mechanism, and a diaphragm scale 22 for the manual selection of the diaphragm apertures. The registration of these three ranges takes place with the stationary index 21 which is also used for the reading of the distance values.

The actuating ring 19 is provided at its inner circumference with the following deflection, disconnecting and connecting cams: The deflection cam 38, viewed from above, springs back toward the outer circumference of the ring 19 when higher guide numbers are adjusted and is shaped to conform to the values of the guide number scale. Then follows the disconnecting cam 51 which has a higher pitch and converges with a part 52 concentric to the optical axis. This part 52 is followed by the deflection cam 48 for the manual diaphragm aperture formation. This last mentioned cam is shaped in such a manner that it begins with a protruding part which corresponds to the smallest aperture f:22 and terminates in a part which springs back farthest toward the outer circumference of the ring 19 and corresponds to the largest diaphragm aperture.

Next may be mentioned the course of the cam 64 which after passing a recess 57 regains its original height. This cam 64 constitutes the disconnecting cam for the scanning member 63 of the range of the exposure control mechanism, while the recess 57 constitutes the connecting cam for this scanning member.

Between the actuating ring 19, respectively the scanning device for the automatic exposure control mechanism and the distance scale ring 59 on the one hand and the diaphragm mechanism on the other hand are provided intermediate or transfer members, respectively, which are adjustable in their rotative positions and able to store the adjusted values of guide number, distance and diaphragm aperture and to transfer the same to the diaphragm mechanism. For scanning and storing of the guide number values there is provided the scanning lever 37 which engages the deflection cam 38 by the scanning pin 30 attached to one of its ends and which is pretensioned by the spring 31. The lever 37 in its extreme position corresponds to the adjusted guide number 10; if higher guide numbers are adjusted, the lever 37, since the cam 38 recedes more and more, performs a clockwise rotation which has the result that the other lever end 137 moves more and more downwardly.

The scanning of the adjusted distance is transferred to this guide number scanning lever 37 by means of the scanning pin 65, the sleeves 66, 67, the scanning lever 44 and the connecting point 40. The scanning device 44, 65 is pulled by the same spring 31 which influences the scanning lever 37 toward the cam 3. The lever 44 is mounted to the scanning lever 37 at 40 so that the deflection movements of the lever 44 are transferred to the lever 37. The pin 65 serves at the same time as the stationary axis of rotation for this lever system. It will be noted that the deflection movements of the lever 37 are superimposed by those of the distance scanning device 65, 44 so that the lever end 137 combines in itself the sum or the difference, respectively, of all deflections caused by the adjustments of the guide numbers and the distances. It has previously been pointed out that the adjustment to higher guide numbers causes a downward movement of the lever end 137; it may be added that also the adjustment of smaller distance values results in a downward movement of the lever end 137. Accordingly, the adjustment to lower guide numbers and higher distance values effects an opposite, namely upward movement of the lever end 137 which, however, is not possible in the example shown in view of the guide numbers.

The scanning member for the manual diaphragm adjustment is formed by the lever 34 which is provided at its upper end with a pin 33 protruding from both sides of the lever 34, and at its lower end with a stop arm 35. The scanning lever 34, which is shaped as a bell crank lever, is held between its ends by the screw 156 and is loosely rotatable about the shaft 56. It is therefore able to store the deflections forced upon it by the scanning lever 37 as well as the control movements of the deflection cam 48 and to transfer the same to the diaphragm mechanism. In order that the scanning lever 34 may store the control movements of the scanning lever 37, these two parts are coupled by means of the pin-slot connection 33, 32. The lever 34 comes into engagement with the rotatable diaphragm cage 4 by means of the arm 35 and a lever 76 when the camera is released.

Furthermore, the lever 34 is also connected with the lever 47 for the exposure control mechanism by means of the projection 39 and the stop plate 46. This lever 47 is fixedly mounted on the control shaft 56 which receives its control movements from the scanning device in accordance with the position of the pointer 60 (see FIG. 1). Since the exposure control mechanism along with its scanning device does not constitute an immediate part of the invention illustrated in FIG. 2, it is only shown in FIG. 1.

The lever 47 for the exposure control mechanism serves substantially for the purpose of restricting the control movements of the shaft 56 to the operating range of the automatic exposure control mechanism. For this purpose the lever 47 is provided at its lower end with the scanning pin 63 cooperating with the disconnecting cams 64 and the connecting recess 57, and at its other end with the coupling connection 39, 46. In the illustrated position of the actuating ring 19, which corresponds to the operating range of the automatic flash bulb exposure mechanism, the automatic exposure control mechanism has to be rendered ineffective. This is accomplished by positioning the scanning pin 63 upon the disconnecting cam 64. Only when the camera is switched from the operating range of the automatic flash bulb exposure mechanism to the range of the exposure control mechanism by means of a counterclockwise rotation of the actuating ring 19 until a mark "A" 49 and the index 21 are opposite each other, the scanning pin 63 drops into the recess 57 which is of such a depth that the lever 34 and therewith the control shaft 56 may freely follow even the widest control movements of the pointer scanning device. With 58 is designated the schematically illustrated camera body on or in which are arranged the mechanisms described, and 161 indicates the photoelectric cell required for the operating range of the automatic exposure control mechanism.

The operation of this arrangement according to the invention is as follows: If a smaller distance value is adjusted in combination with the selected guide number 10, the lever 44 on account of the receding deflection cam 3 rotates clockwise so that the guide number scanning lever 37 in view of its connection at 40 perform likewise a clockwise rotation. This has the effect that the upper lever end 137 moves downwardly, i.e. toward the optical axis and presses in view of the coupling 32, 33 upon the adjacent end of the scanning lever 34 for the manual diaphragm adjustment. This lever 34 is at present rendered ineffective with respect to its own scanning movements. It will be rendered operative only when upon a corresponding adjustment of the actuating ring 19 its scanning pin 33 comes into engagement with the deflection cam 48. In the illustrated adjustment to the range of the automatic flash bulb exposure mechanism the lever 34 acts merely as a transfer member for transferring the deflection movements of the lever 37 to the diaphragm mechanism. The downward displacement of the lever end 34 carrying the coupling pin 33 results in a counterclockwise rotation of the scanning lever 34 about the shaft 56. This means that the stop 35 of the lever 34 swings outwardly whereby the stop 35 moves away from the counter stop 76 provided on the diaphragm cage 4. The result is that the diaphragm cage 4 upon release of the camera performs a closing movement which causes a closing of the diaphragm segments about a certain degree. If for instance the distance adjusting ring has been set to the value 1 m. instead of the value 5 m., as shown, a diaphragm aperture f:10 is formed automatically upon release of the camera according to the known relation diaphragm=guide number:distance This means that the diaphragm has been closed for almost five intervals.

The same result will be obtained when the guide number ring is adjusted to a higher guide number instead of to the lowest guide number 10, as illustrated. The scanning lever 37 then moves again clockwise, since the guide number cam 38 recedes increasingly in proportion to the adjusted higher guide numbers toward the outer circumference of the ring 19 so that the lever end 137 again moves downwardly toward the optical axis. Upon release of the camera the diaphragm will now likewise be closed about a corresponding number of diaphragm intervals.

Instead of to the operating range of the automatic flash bulb exposure mechanism the camera may now be adjusted to the operating range of the automatic exposure control mechanism by bringing the mark "A" and the index 21 into opposition. After a rotation of the actuating ring 19 in counterclockwise direction, the pin 30 arranged on the scanning lever 37 moves into the region of the disconnecting cam 51 and subsequently into that of the recess 52 whereby the support for the scanning pin 30 is dispensed with. The lever 37 is freely movable and the control movements coming from the distance deflection cam 3 have no longer any effect on the lever 34.

When moving the mark "A" opposite the index 21 the scanning pin 63 has left the disconnecting cam 64 and has been positioned opposite the connecting recess 57. The result is that the shaft 56 is permitted to impart its control movements via the coupling connection 39, 46 to the scanning lever 34 and therewith via the abutment connection 35, 76 to the diaphragm mechanism.

Finally, if for the operation of the camera the range of the manual diaphragm adjustment is selected, the scanning pin 33 on the lever 34 as a result of the opposition of one of the values of the diaphragm scale 22 to the index 21 will move into the range of the deflection cam 48. It is obvious that the cam portions corresponding to small diaphragm apertures, as for instance f:22 of f:16, extend closely to the optical axis, while the cam portions corresponding to larger diaphragm apertures, as for instance f:2, f:2.8 or f:4, recede from the optical axis so that the scanning pin 33 will be pushed down with the adjustment to small diaphragm apertures and will be raised when large diaphragm apertures are adjusted. This means that the scanning lever 34 at a diaphragm aperture of f:22 performs its greatest rotation about the shaft 56 in counterclockwise direction which corresponds to the longest return movement of the diaphragm cage 4 in clockwise direction upon release of the camera. Thus the diaphragm is closed down to its smallest aperture. Conversely, with the adjustment to larger diaphragm apertures a proportional increased rotation of the scanning lever 34 in clockwise direction will take place which has the effect that the diaphragm cage upon release of the camera is capable of no return movement or only of one of negligible duration, so that the diaphragm remains fully or almost fully open. An influencing of the scanning lever 34 for the manual diaphragm formation by the two other scanning levers 37 and 47, respectively, is precluded because the lever 37 has been rendered inoperative by the action of the cam 51, 52, and the lever 47 has become ineffective by means of the cam 64.

What we claim is:

1. In a photographic camera, the combination with an interchangeable lens system, a distance adjusting means and an adjustable diaphragm, of means providing for flash bulb exposure operation and for a plurality of other operations, including an automatic exposure adjustment and a manual diaphragm adjustment including a diaphragm preselection; a manual adjustment means for selectively adjusting the camera to any one of said operations and for rendering the nonselected operations ineffective, said manual adjusting means including a ring rotatably mounted on said camera and provided on its outer circumference with a serially arranged guide number scale, a mark for the automatic exposure adjustment and a diaphragm aperture scale for the manual diaphragm adjustment, said rotatably mounted ring being provided on its inner circumference with a plurality of cams for operating pivotally mounted intermediate levers, one end of which engaging said cams to be deflected by the same while the other ends of said levers are adapted to be selectively operatively connected with said adjustable diaphragm, means for mounting said distance adjusting means on said interchangeable lens system, cam means on said distance adjusting means, said cam means operating a pivotally mounted intermediate lever (44), said lever being operatively connected with one (37) of said levers which is controlled by that cam (38) on said ring (19) which is associated with said guide number scale thereon, and means for transferring the sum of the deflections of said levers to a common member (70, FIG. 1; 35, FIG. 2) which effects an adjustment of said diaphragm.

2. A photographic camera according to claim 1, in which said common member upon adjustment of the camera to the range of automatic exposure adjustment (A) is controlled by a lever (47) which is mounted on the same axis as said common member (35) and carries a scanning element (63) which engages predetermined cams associated with said rotatable ring (19).

3. A photographic camera according to claim 1, in which said intermediate levers which are operated by said cams on said rotatably mounted ring are arranged about a common axis which also forms the carrier for a lever arm (70) which is operated by the automatic exposure adjustment (FIG. 1).

4. A photographic camera according to claim 1, in which said intermediate levers which are operated by said cams on said rotatable ring are positioned along the inner circumference of said ring (FIG.2).

References Cited by the Examiner
UNITED STATES PATENTS

| | | | |
|---|---|---|---|
| 2,993,422 | 7/61 | Rentschler | 95—10 |
| 3,013,478 | 12/61 | Gebele | 95—10 |
| 3,029,718 | 4/62 | Rentschler | 95—10 |
| 3,075,442 | 1/63 | Koppen et al. | 95—10 |

NORTON ANSHER, *Primary Examiner.*

E. G. ANDERSON, EVON C. BLUNK, *Examiners.*